(12) United States Patent
Yen et al.

(10) Patent No.: US 12,028,471 B2
(45) Date of Patent: Jul. 2, 2024

(54) SUPPORTING STAND

(71) Applicant: SYNCMOLD ENTERPRISE CORP., New Taipei (TW)

(72) Inventors: Ching-Hui Yen, New Taipei (TW); Yu-Ming Kao, New Taipei (TW); Po-Chun Chiu, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 0 days.

(21) Appl. No.: 18/176,948

(22) Filed: Mar. 1, 2023

(65) Prior Publication Data

US 2023/0313942 A1 Oct. 5, 2023

Related U.S. Application Data

(60) Provisional application No. 63/325,962, filed on Mar. 31, 2022.

(30) Foreign Application Priority Data

Oct. 25, 2022 (TW) .................................. 111211652

(51) Int. Cl.
*H04M 1/02* (2006.01)
*F16M 11/10* (2006.01)
(Continued)

(52) U.S. Cl.
CPC .......... *H04M 1/0268* (2013.01); *F16M 11/10* (2013.01); *F16M 11/2042* (2013.01);
(Continued)

(58) Field of Classification Search
CPC .... H04M 1/0268; H04M 1/022; F16M 11/10; F16M 11/2042; F16M 11/24; F16M 13/02; F16M 2200/068
See application file for complete search history.

(56) References Cited

U.S. PATENT DOCUMENTS 4,836,486 A * 6/1989 Vossoughi ......... F16M 11/2014
248/921
5,996,954 A * 12/1999 Rosen ................. B60R 11/0235
248/278.1

(Continued)

FOREIGN PATENT DOCUMENTS

CN 112738675 A 4/2021

*Primary Examiner* — Anita M King
(74) *Attorney, Agent, or Firm* — MUNCY, GEISSLER, OLDS & LOWE, P.C.

(57) ABSTRACT

A supporting stand comprises a bearing unit, a first rod, a second rod, a sleeve assembly, a regulating assembly, an elastic element, a first steel cable, and a second steel cable. The first rod pivotally connects with the bearing unit, the second rod pivotally connects with the first rod, and the sleeve assembly pivotally connects with the second rod. The regulating assembly is disposed in the sleeve assembly, the elastic element is disposed in the second rod, the first steel cable is connected to the elastic element and the first rod respectively, and the second steel cable is connected to the elastic element and the regulating assembly respectively. The sleeve assembly is operated to drive the regulating assembly to move, so that the second steel cable, the elastic element, and the first steel cable move simultaneously to adjust the tension compensation for the bearing unit.

16 Claims, 15 Drawing Sheets

(51) Int. Cl.
*F16M 11/20* (2006.01)
*F16M 11/24* (2006.01)
*F16M 13/02* (2006.01)

(52) U.S. Cl.
CPC .......... *F16M 11/24* (2013.01); *F16M 13/022* (2013.01); *H04M 1/022* (2013.01); *F16M 2200/068* (2013.01)

(56) References Cited

U.S. PATENT DOCUMENTS

| | | | | |
|---|---|---|---|---|
| 7,389,965 B2 * | 6/2008 | Oddsen, Jr. | ........ | F16M 11/2014 361/825 |
| 8,490,937 B2 * | 7/2013 | Crain | ................... | F16M 11/041 248/316.4 |
| 2015/0366336 A1 * | 12/2015 | Wong | ..................... | F16M 11/38 248/371 |

* cited by examiner

SUPPORTING STAND

CROSS REFERENCE TO RELATED APPLICATION

This application claims the benefit of U.S. Provisional Application Ser. No. 63/325,962 filed on Mar. 31, 2022, and the benefit of Taiwan Patent Application Serial No. 111211652 filed on Oct. 25, 2022. The entirety of each application is incorporated herein by reference.

BACKGROUND OF THE INVENTION

1. Field of the Invention

The present invention relates to a supporting stand, especially a supporting stand can conveniently adjust the compensation force.

2. Description of Related Art

China patent publication No. CN112738675A discloses a microphone stand, which includes a desk retaining clamp, a regulating seat, a lower arm, an upper arm, and a microphone seat. The lower end of the lower arm is connected to the swivel seat, the upper end of the lower arm is rotatably connected to the lower end of the upper arm, and the upper end of the upper arm is connected to the microphone seat to fix the microphone. The knurled screw nut is disposed on the regulating seat, the internal thread of the knurled screw nut is connected to the screw rod, and the screw rod is connected to the microphone seat through a tension spring, a long steel cable, and a short steel cable. Therefore, rotating the knurled screw nut can drive the screw rod to adjust the tension on the tension spring, and then adjusts the supporting force of the stand.

However, when adjusting the tension of the tension spring by rotating the knurled screw nut, because the knurled screw nut is directly connected to the screw rod through the internal thread, the knurled screw nut can only drive the screw rod to raise or descend to a height of one pitch at every 360-degrees rotation. Accordingly, when a user needs to adjust the tension force greater, the knurled screw nut must be repeatedly rotated several times to fulfill the operation requirements, which takes time and labor.

SUMMARY OF THE INVENTION

An objective of the present invention is to provide a supporting stand for fitting various electronic devices of different sizes and weights. When the user wants to adjust the angle and position of the supporting stand or the posture of the electronic device placed on it, the compensation force that the supporting stand needs to provide is different. The supporting stand of the present invention enables the user to easily and quickly adjust the compensation force of the supporting stand.

To achieve the above-mentioned objective, the present invention discloses a supporting stand being disposed on a working surface to bear an electronic device. The supporting stand comprises a bearing unit, a first rod, a second rod, a sleeve assembly, a regulating assembly, an elastic element, a first steel cable, and a second steel cable. The bearing unit includes a joint end and connects with the electronic device. The first rod includes a first connecting head portion and a first connecting end portion opposite to the first connecting head portion. The first connecting head portion pivotally connects with the joint end at a first axis so that the bearing unit is able to rotate with respect to the first rod. The second rod includes a second connecting head portion and a second connecting end portion, and the second connecting head portion pivotally connects with the first connecting end portion at a second axis so that the first rod is able to rotate with respect to the second rod. The sleeve assembly includes a first sleeve, a second sleeve and a shaft rod. The first sleeve has a sleeve joint portion and a containing hole, and the sleeve joint portion pivotally connects with the second connecting end portion at a third axis so that the second rod is able to rotate with respect to the sleeve assembly. The first sleeve pivotally connects with the second sleeve through the shaft rod at a fourth axis so that the second sleeve is able to rotate with respect to the first sleeve, and the second sleeve has a gear structure. The regulating assembly is disposed in the sleeve assembly and includes a gear, a screw and a threaded sleeve, and the gear sleeves on and is fixed with the screw to engage with the gear structure. The screw is screwed with the threaded sleeve, and the threaded sleeve is movably disposed in the containing hole along a fifth axis. The elastic element is disposed in the second rod and includes a first end and a second end. The first steel cable is connected with the first end and the first connecting head portion therebetween. The second steel cable is connected with the second end and the threaded sleeve therebetween. When the second sleeve rotates with respect to the first sleeve, the gear and the screw are driven to rotate by the gear structure to drive the threaded sleeve moving so that the second steel cable, the elastic element, and the first steel cable move simultaneously.

In one embodiment of the present invention, the screw is disposed along the fifth axis, and the fifth axis is parallel to the fourth axis.

In one embodiment of the present invention, the screw includes a smooth segment and a threaded segment. The gear includes a central hole and is disposed on the smooth segment of the screw through the central hole.

In one embodiment of the present invention, the central hole is a non-circular hole, and the smooth segment has an outer contour corresponding to the non-circular hole for the gear to drive the screw rotating simultaneously.

In one embodiment of the present invention, the gear structure has a shaft hole for the shaft rod to penetrate through, and the second sleeve drives the gear structure rotating simultaneously.

In one embodiment of the present invention, the threaded sleeve includes an opening and a hollow segment extending inwardly along the fifth axis from one end of the threaded sleeve, and the hollow segment communicates with an opposite end of the threaded sleeve through the opening, and a cross section diameter of the opening is not less than a cross section diameter of the second steel cable.

In one embodiment of the present invention, the threaded sleeve further comprises a slot extending inwardly from a side of the threaded sleeve and communicating with the opening and the hollow segment, and a width of the slot is not less than the cross section diameter of the second steel cable.

In one embodiment of the present invention, the second steel cable includes a stop block connecting to the threaded sleeve, and a cross section area of the stop block is smaller than a cross section area of the hollow segment and is greater than a cross section area of the opening.

In one embodiment of the present invention, the threaded sleeve further has an internal thread formed on an inner surface of the hollow segment, and the screw further has an external thread formed on an outer surface of the threaded segment to screw with the internal thread of the threaded sleeve.

In one embodiment of the present invention, the supporting stand further comprises a base, wherein the shaft rod protrudes from the second sleeve and pivotally connects to the base so that the second sleeve is able to rotate with respect to the base.

In one embodiment of the present invention, the supporting stand further comprises a fixed base, wherein the shaft rod protrudes from the second sleeve and connects to the fixed base, and the fixed base clamps to the working surface.

In one embodiment of the present invention, the containing hole is a non-circular hole, and the threaded sleeve has an outer contour corresponding to the non-circular hole so that the threaded sleeve is able to rotate with respect to the first sleeve.

In one embodiment of the present invention, when the second sleeve rotates in a first rotating direction with respect to the first sleeve, the threaded sleeve gradually moves away from the sleeve joint portion and drives the second steel cable to gradually lengthen the elastic element, and thereby an elastic force of the elastic element is gradually increased.

In one embodiment of the present invention, when the second sleeve rotates in a second rotating direction with respect to the first sleeve, the threaded sleeve gradually approaches the sleeve joint portion and drives the second steel cable to gradually shorten the elastic element, and thereby the elastic force of the elastic element is gradually decreased.

In one embodiment of the present invention, the first rod further includes a first through hole, and the second rod further includes a second front through hole. The first steel cable is disposed in the first rod and the second rod, and connects with the first end of the elastic element from the first rod and sequentially through the first through hole, the first connecting end portion and the second connecting head portion which are pivotally connected to each other, and the second front through hole.

In one embodiment of the present invention, the second rod further includes a second rear through hole, and the first sleeve of the sleeve assembly further includes a third through hole. The second steel cable is disposed in the second rod and the sleeve assembly, and connects with the threaded sleeve from the second end of the elastic element and sequentially through the second rear through hole, the second connecting end portion and the sleeve joint portion which are pivotally connected to each other, and the third through hole.

DETAILED DESCRIPTION OF THE PREFERRED EMBODIMENT

Figure 1:
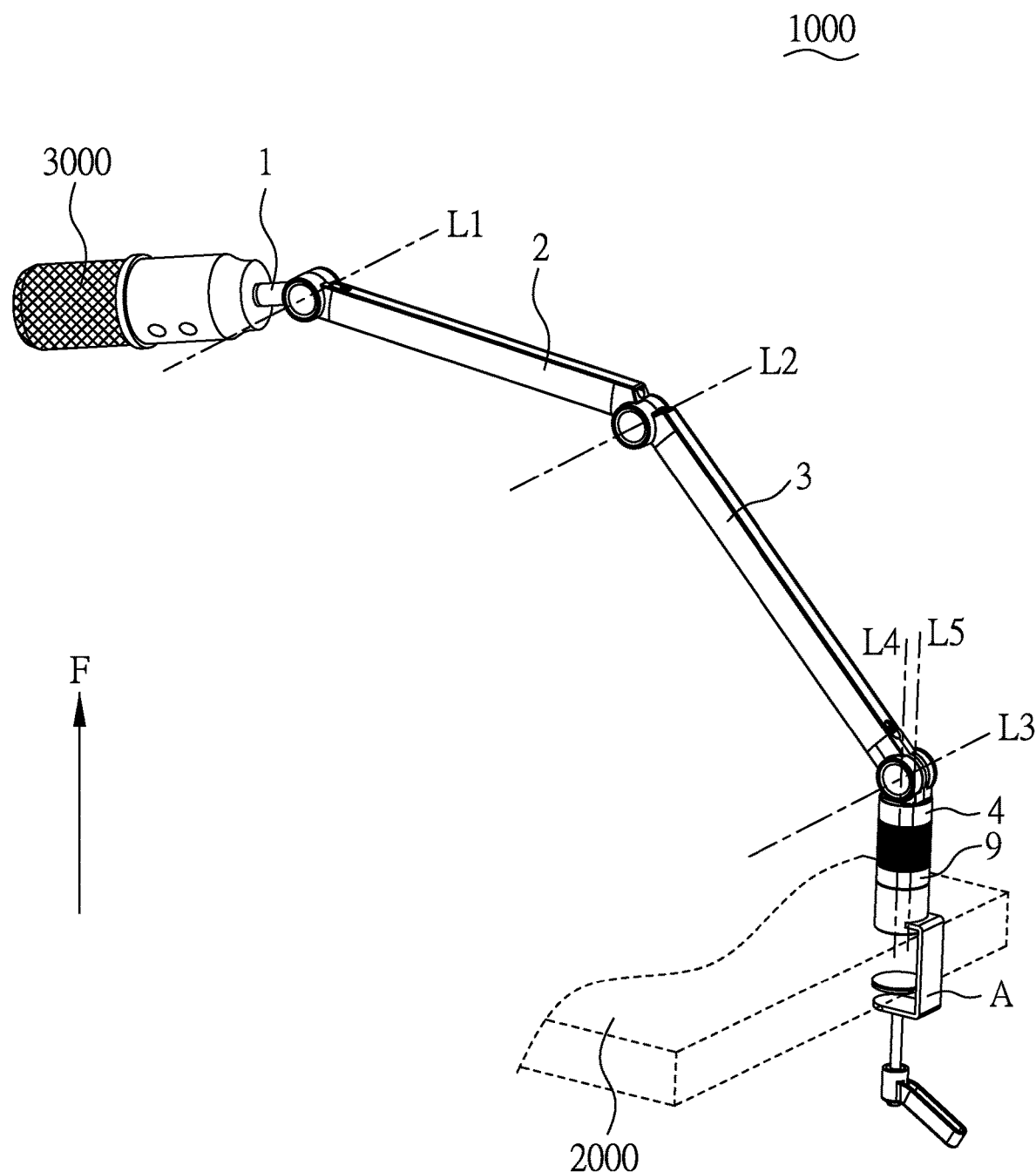
FIG. 1 is a schematic view of the supporting stand according to the present invention.

Reference will now be made in detail to the present embodiments of the invention, examples of which are illustrated in the accompanying drawings, and are not intended to limit the present invention, applications or particular implementations described in these embodiments. Wherever possible, the same reference numbers are used in the drawings and the description to refer to the same or like parts. It shall be appreciated that, in the following embodiments and the attached drawings, elements unrelated to the present invention are omitted from depiction; and dimensional relationships among individual elements in the attached drawings are provided only for ease of understanding, but not to limit the actual scale.

Figure 2:
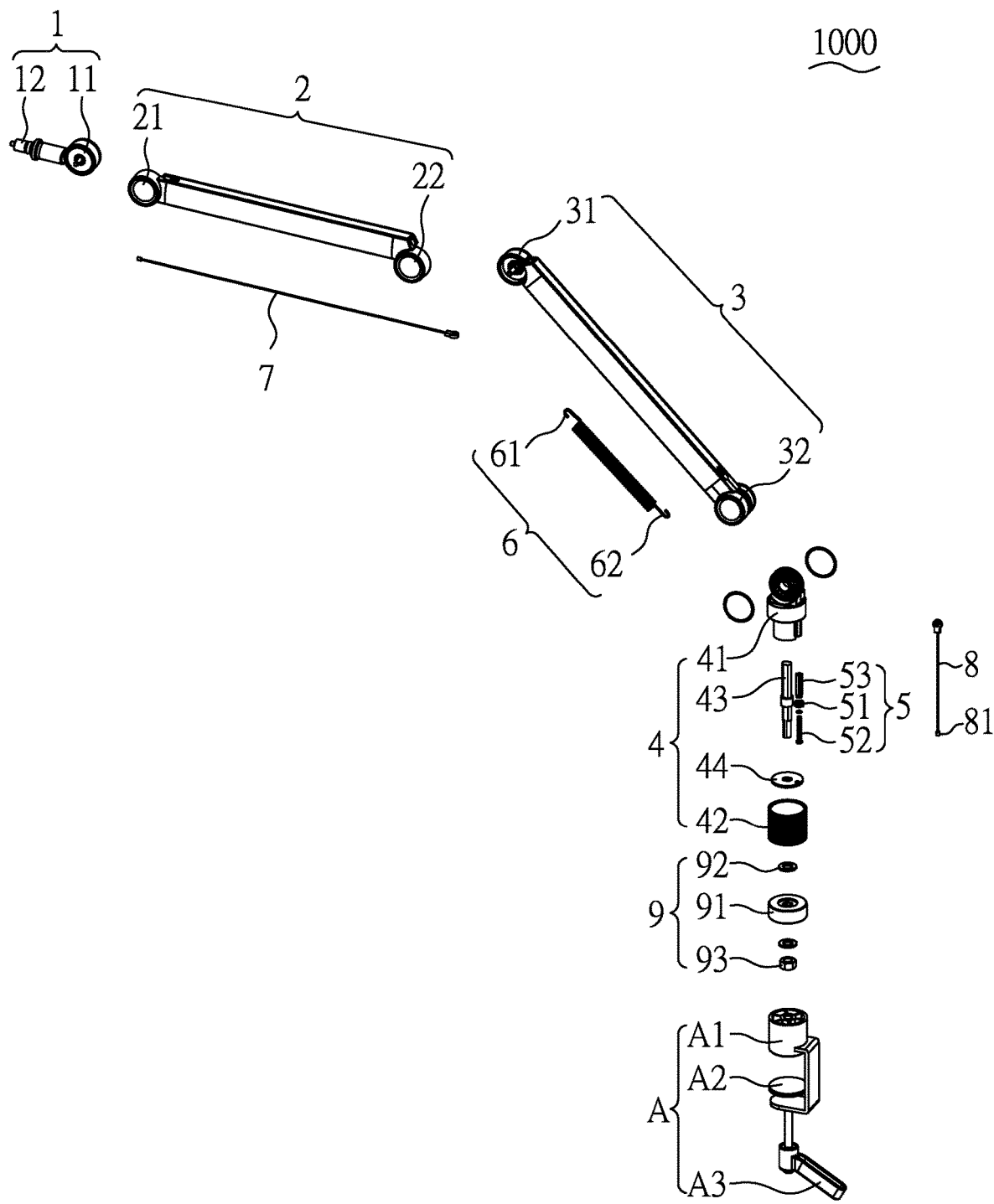
FIG. 2 is an exploded view of the supporting stand according to the present invention.

Please refer to FIG. 1 and FIG. 2. The supporting stand 1000 of the present invention is disposed on a working surface 2000 to support and bear an electronic device 3000. The supporting stand 1000 comprises a bearing unit 1, a first rod 2, a second rod 3, a sleeve assembly 4, a regulating assembly 5, an elastic element 6, a first steel cable 7, a second steel cable 8, a base 9, and a fixed base A. The bearing unit 1 is utilized to bear the electronic device 3000. In this embodiment, the electronic device 3000 is illustrated as a microphone device, but is not limited thereto. The bearing unit 1 and the first rod 2 are pivotally connected to each other. The first rod 2 and the second rod 3 are pivotally connected to each other. The second rod 3 and the sleeve assembly 4 are pivotally connected to each other. The regulating assembly 5 is disposed in the sleeve assembly 4. The elastic element 6 is disposed in the second rod 3. The first steel cable 7 is connected to the elastic element 6 and the first rod 2 respectively. The second steel cable 8 is connected to the elastic element 6 and the regulating assembly 5 respectively. The base 9 pivotally connects to the sleeve assembly 4. The fixed base A pivotally connects to the base 9, and the fixed base A clamps to the working surface 2000.

In this embodiment, the working surface 2000 is illustrated as a desktop, and the fixed base A is fixed on the edge of the desktop by clamping, but is not limited thereto. The first axis L1, the second axis L2, the third axis L3, the fourth axis L4, the fifth axis L5 and the normal direction F are shown in the drawings of the present invention, wherein the first axis L1, the second axis L2 and the third axis L3 are substantially perpendicular to the normal direction F, and the fourth axis L4 and the fifth axis L5 are substantially parallel to the normal direction F.

Please referring back to FIG. 1 and FIG. 2. The bearing unit 1 includes a joint end 11 and a fixed end 12. The joint end 11 is roughly cylindrical and is pivotally connected to the first rod 2. The fixed end 12 is used to bear the electronic device 3000, and the fixed end 12 can be connected with the joint end 11. In this embodiment, the fixed end 12 is an example of a structure that can be correspondingly connected to the microphone device, which is not limited thereto. The electronic device 3000 can be carried and fixed by setting screws, clamps or fixed parts with similar functions.

Figure 3:
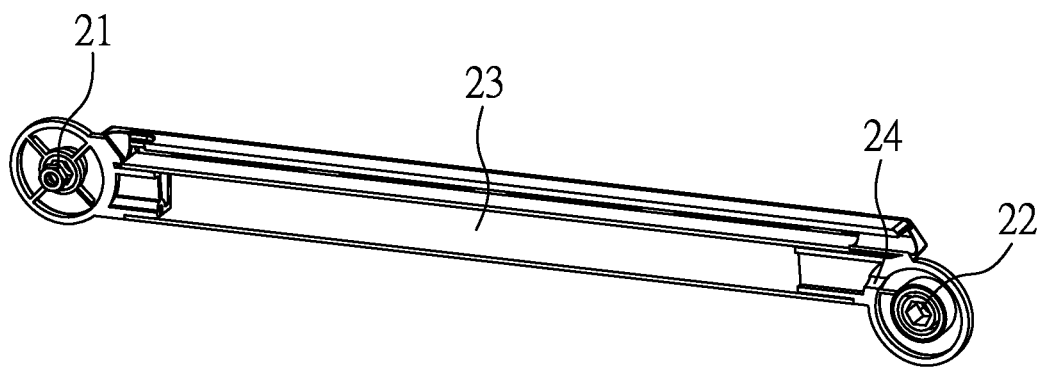
FIG. 3 is a sectional view of the first rod of the supporting stand according to the present invention.

Reference is made to FIG. 1 to FIG. 3. The first rod 2 includes a first connecting head portion 21, a first connecting end portion 22, a first through groove 23, and a first through hole 24. The first connecting head portion 21 of the first rod 2 is roughly cylindrical and pivotally connects with the joint end 11 of the bearing unit 1 at the first axis L1 for the bearing unit 1 to rotate with respect to the first rod 2. The first connecting end portion 22 is roughly cylindrical and opposite to the first connecting head portion 21, and the first connecting end portion 22 is pivotally connected to the second rod 3. The first through groove 23 is disposed in the first rod 2, wherein one end of the first through groove 23 is connected to the first connecting head portion 21, and the other opposite end of the first through groove 23 communicates with the first connecting end portion 22 through the first through hole 24.

Figure 4:
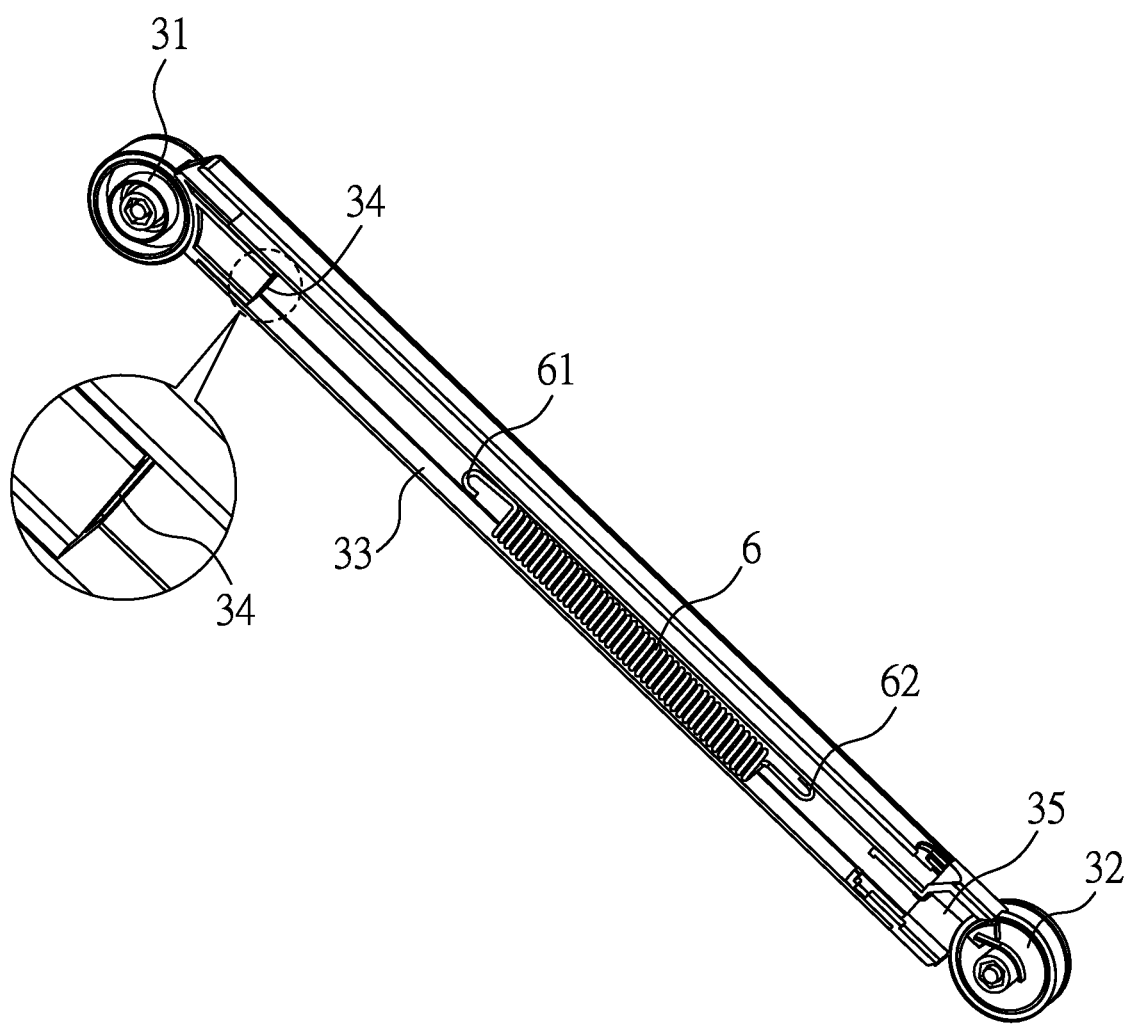
FIG. 4 is a sectional view of the second rod of the supporting stand according to the present invention.

Please refer to FIG. 1, FIG. 2, and FIG. 4. The second rod 3 includes a second connecting head portion 31, a second connecting end portion 32, a second through groove 33, a second front through hole 34, and a second rear through hole 35. The second connecting head portion 31 of the second rod 3 is roughly cylindrical and pivotally connects with the first connecting end portion 22 of the first rod 2 at the second axis L2 for the first rod 2 to rotate with respect to the second rod 3. The second connecting end portion 32 is roughly cylindrical and opposite to the second connecting head portion 31, and the second connecting end portion 32 is pivotally connected to the sleeve assembly 4. The second through groove 33 is disposed in the second rod 3, wherein one end of the second through groove 33 communicates with the second connecting head portion 31 through the second front through hole 34, and the other opposite end of the second through groove 33 communicates with the second connecting end portion 32 through the second rear through hole 35.

Reference is made to FIG. 1, FIG. 2, FIG. 5 and FIG. 6. The sleeve assembly 4 includes a first sleeve 41, s second sleeve 42, a shaft rod 43, and a baffle plate 44. The first sleeve 41 pivotally connects with the second sleeve 42 through the shaft rod 43 at the fourth axis L4, so that the second sleeve 42 rotates coaxially with respect to the first sleeve 41. The first sleeve 41 has a sleeve joint portion 411, a containing hole 412, and a third through hole 413. The sleeve joint portion 411 pivotally connects with the second connecting end portion 32 of the second rod 3 at the third axis L3 for the second rod 3 to rotate with respect to the sleeve assembly 4. The containing hole 412 communicates with the sleeve joint portion 411 through the third through hole 413. In this embodiment, the containing hole 412 has a non-circular cross section, such as hexagonal shaped hole, but not limited thereto. The second sleeve 42 has a hollow shell 420, a gear structure 421, and a shaft hole 422. The gear structure 421 is disposed on the inner bottom surface of the hollow shell 420, and the shaft hole 422 penetrates through the center of the hollow shell 420 and the gear structure 421. The shaft rod 43 passes through the shaft hole 422 so that the second sleeve 42 can drive the gear structure 421 to rotate synchronously when rotating with respect to the first sleeve 41. The baffle plate 44 has a corresponding shaft hole 441 and an aperture 442 in the center, and the aperture 442 is located away from the corresponding shaft hole 441. The baffle plate 44 is disposed between the first sleeve 41 and the second sleeve 42, and the shaft rod 43 passes through the corresponding shaft hole 441.

Figure 7:
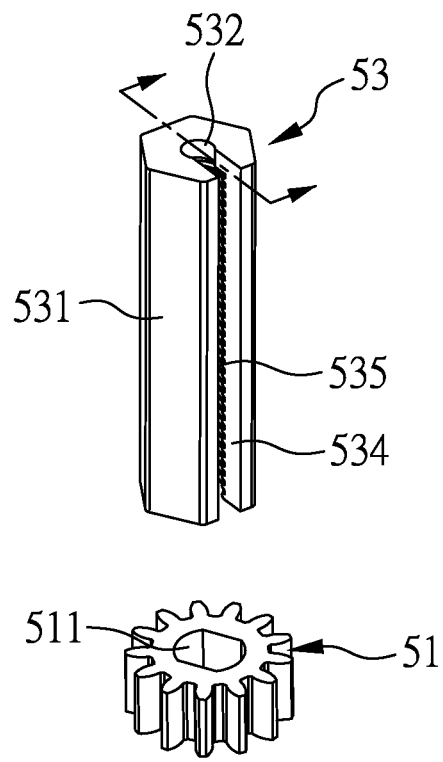
FIG. 7 is a schematic view of the regulating assembly of the supporting stand according to the present invention.
Figure 7:
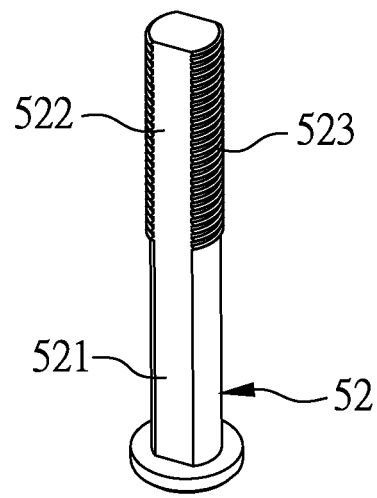
Figure 8:
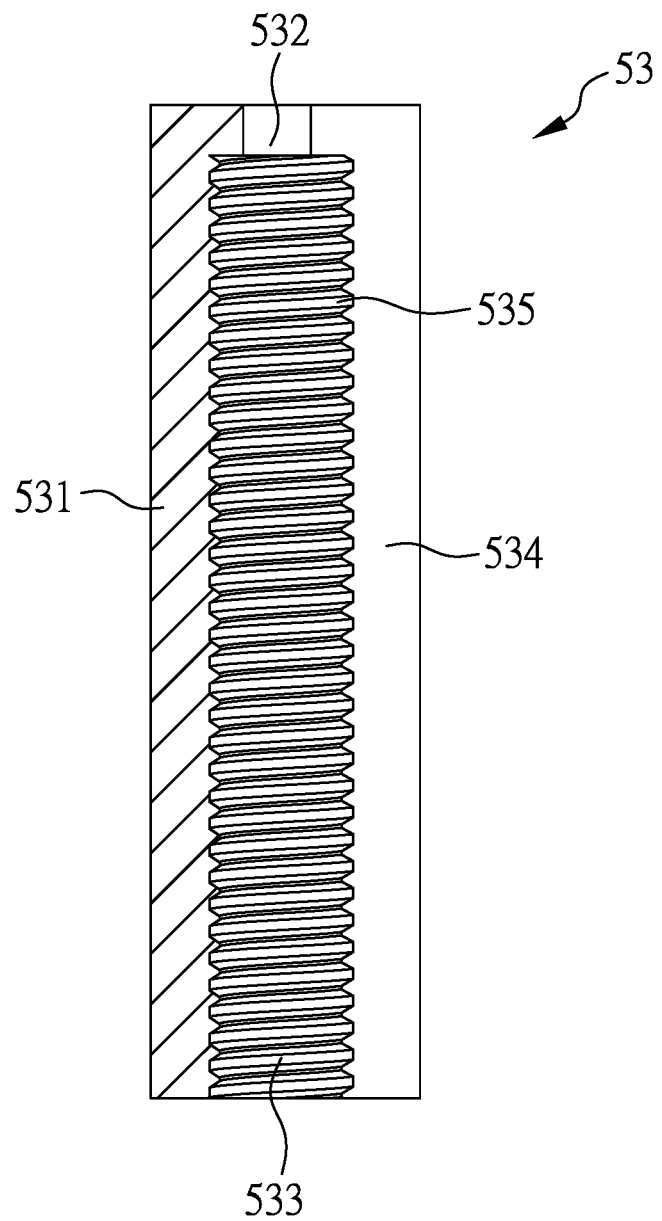
FIG. 8 is a sectional view of the threaded sleeve of the regulating assembly of the supporting stand according to the present invention.

Please refer to FIG. 2, FIG. 7 and FIG. 8. The regulating assembly 5 is disposed in the sleeve assembly 4. The regulating assembly 5 includes a gear 51, a screw 52, and a threaded sleeve 53. The gear 51 has a central hole 511, the gear 51 sleeves and is fixed on the screw 52 through the central hole 511, and the gear 51 engages with the gear structure 421 of the second sleeve 42. In this embodiment, the central hole 511 is a non-circular hole, such as a flat sided hole, but not limited thereto. The screw 52 has a smooth segment 521, a threaded segment 522, and an external thread 523. The smooth segment 521 connects with the threaded segment 522, and the smooth segment 521 has an outer contour corresponding to the central hole 511 (for example, the cross sectional outer contour of the smooth segment 521 adopts the similar flat sided contour) for the gear 51 to drive the screw 52 to rotate simultaneously. The external thread 523 is formed on the outer surface of the threaded segment 522. The gear 51 sleeves on the smooth segment 521 of the screw 52 through the central hole 511, and the gear 51 is disposed away from the threaded segment 522 of the screw 52 and engages with the gear structure 421. In this embodiment, the gear 51 and the gear structure 421 are respectively an external gear as an example. In addition, the screw 52 is disposed along the fifth axis L5, and the fifth axis L5 is parallel to the fourth axis L4. The screw 52 passes through the aperture 442 of the baffle plate 44, so that the gear structure 421 and the gear 51 are disposed between the baffle plate 44 and the second sleeve 42 for providing the auxiliary positioning effect to the gear 51.

Figure 5:
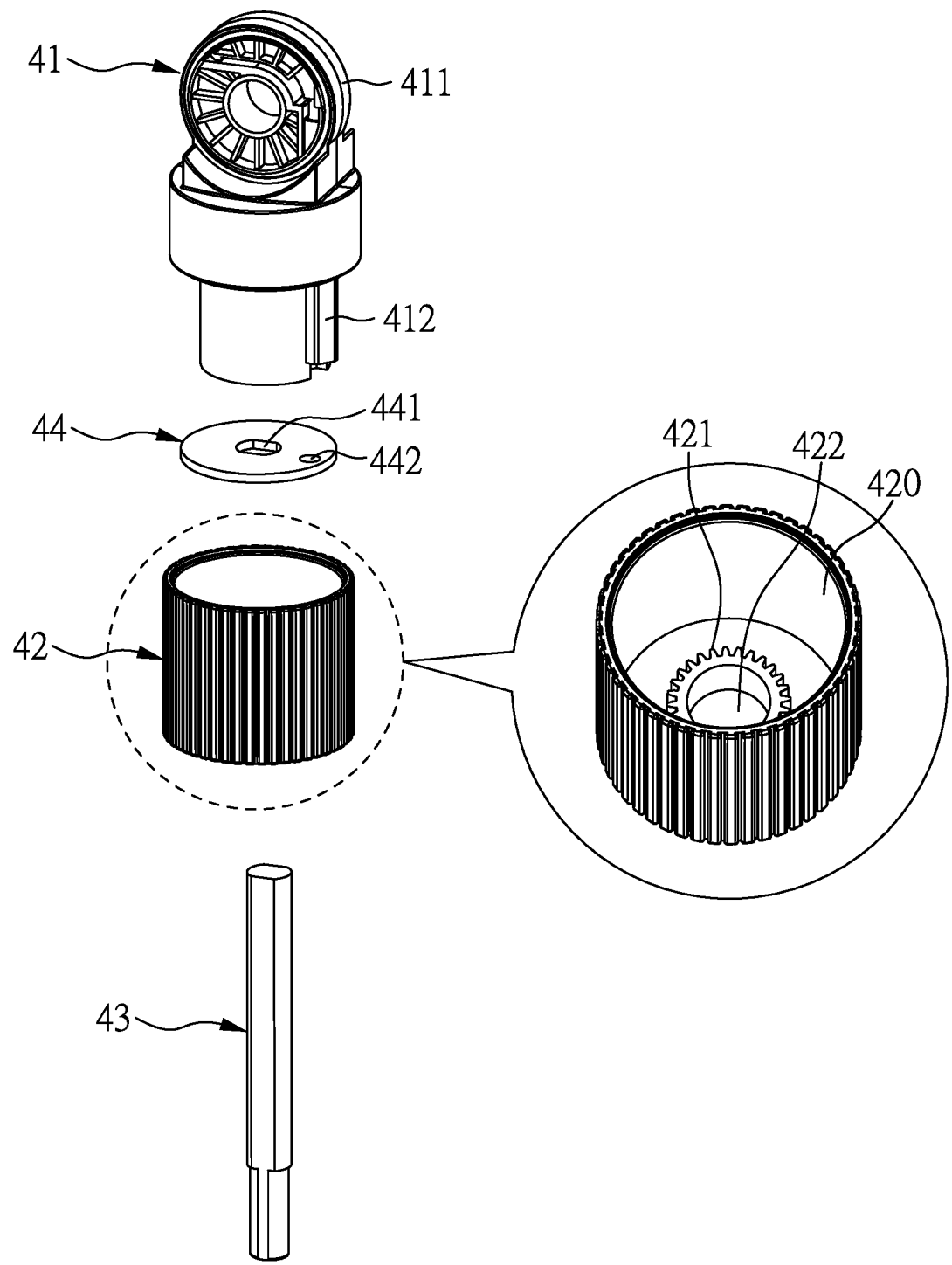
FIG. 5 is a schematic view of the sleeve assembly of the supporting stand according to the present invention.
Figure 6:
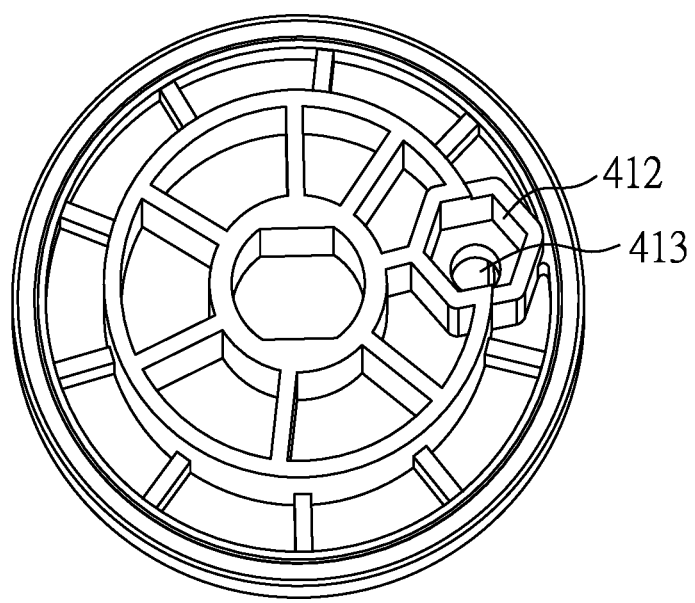
FIG. 6 is an inclined bottom view of the first sleeve of the sleeve assembly of the supporting stand according to the present invention.

The threaded sleeve 53 has a sleeve body 531, an opening 532, a hollow segment 533, a slot 534, and an internal thread 535. The hollow segment 533 extends inwardly along the fifth axis L5 from one end of the sleeve body 531 and communicates with an opposite end of the sleeve body 531 through the opening 532. The slot 534 extends inwardly from a side of the sleeve body 531 and communicates with the opening 532 and the hollow segment 533, and the slot 534 communicates from one end of the sleeve body 531 to the other end (so that the sleeve body 531 have a C-shaped cross section). The internal thread 535 is formed on an inner surface of the hollow segment 533, so that the screw 52 screws with the internal thread 535 of the threaded sleeve 53 through the external thread 523, and the threaded sleeve 53 is movably disposed in the containing hole 412 of the first sleeve 41 along a fifth axis. The cross section diameter of the opening 532 is not less than the cross section diameter of the second steel cable 8, and the width of the slot 534 is not less than the cross section diameter of the second steel cable 8, so that the second steel cable 8 can pass through the opening 532 and the slot 534. In this embodiment, the threaded sleeve 53 has an outer contour corresponding to the containing hole 412 (such as a hexagonal shaped hole) as shown in FIG. 5 or FIG. 6 for the threaded sleeve 53 to rotate with respect to the first sleeve 41. In other words, the threaded sleeve 53 can only move linearly along the fifth axis L5 with respect to the first sleeve 41 without rotation.

Referring to FIG. 2 and FIG. 4, the elastic element 6 is disposed in the second through groove 33 of the second rod 3, and the elastic element 6 includes a first end 61 and a second end 62. In this embodiment, the elastic element 6 is illustrated as an extension spring, but is not limited thereto.

Figure 9:
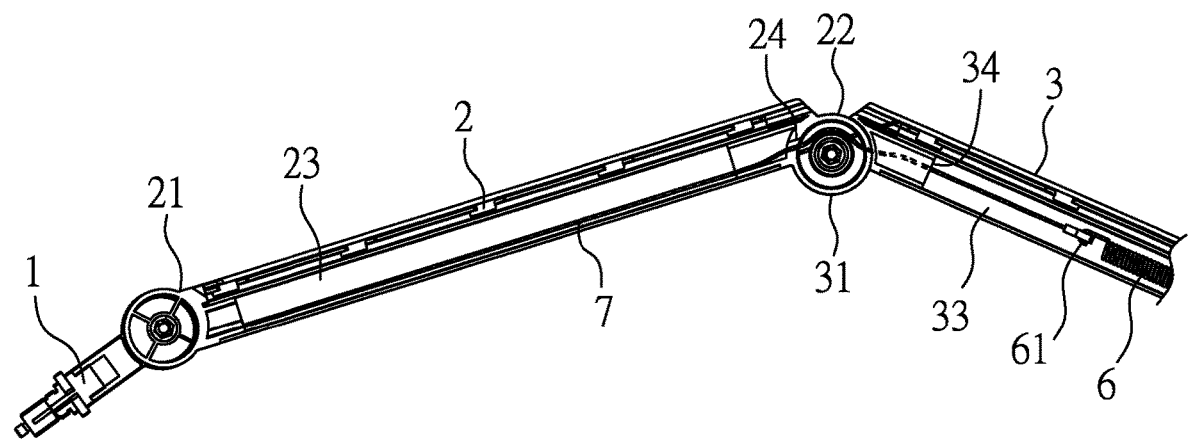
FIG. 9 is a schematic view showing the arrangement of the first steel cable of the supporting stand according to the present invention.

Reference is made to FIG. 2 and FIG. 9. The opposite ends of the first steel cable 7 are respectively connected to the first end 61 of the elastic element 6 and the first connecting head portion 21 of the first rod 2, and the tension of the first steel cable 7 can be adjusted according to requirements. In this embodiment, the first steel cable 7 extends from the first connecting head portion 21 of the first rod 2 along the first through groove 23 toward the first connecting end portion 22. After passing through the first through hole 24, the first steel cable 7 extends through the first connecting end portion 22 and the second connecting head portion 31 which are pivotally connected to each other. Then, the first steel cable 7 passes through the second front through hole 34 of the second rod 3 and extends along the second through groove 33 to the first end 61 of the elastic element 6, so that the first steel cable 7 can be roughly accommodated in the first rod 2 and the second rod 3 to avoid the exposure affecting the overall operation.

Figure 10:
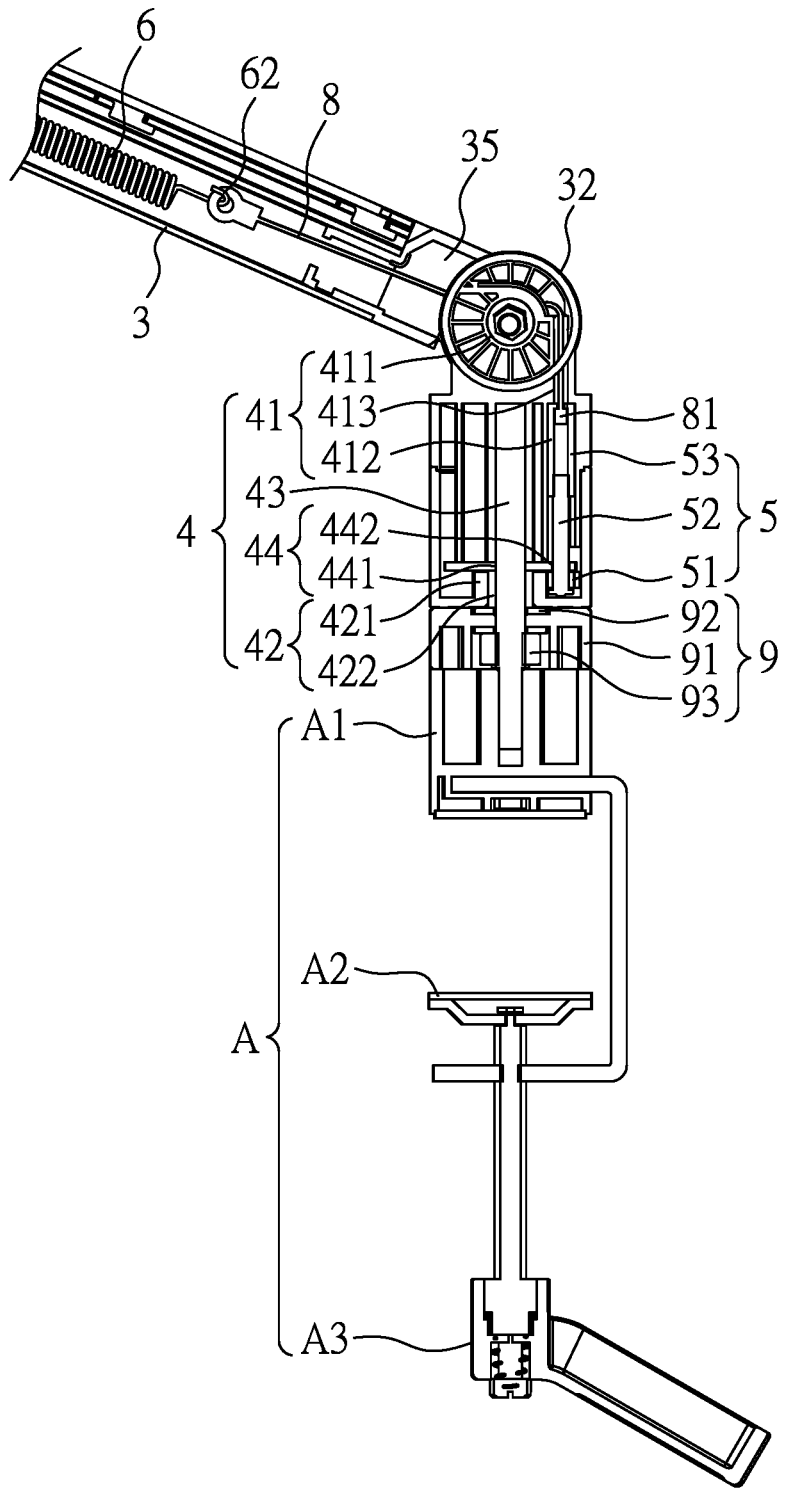
FIG. 10 is a schematic view showing the arrangement of the second steel cable of the supporting stand according to the present invention.

Please refer to FIG. 2, FIG. 6 and FIG. 10. The opposite ends of the second steel cable 8 are respectively connected to the second end 62 of the elastic element 6 and the threaded sleeve 53 of the regulating assembly 5, and the tension of the second steel cable 8 can be adjusted according to requirements. One end of the second steel cable 8 includes a block stop 81 (for example, the second steel cable 8 could be a bicycle brake cable), the second steel cable 8 is connected and fixed to the sleeve body 531 of the threaded sleeve 53 through the stop block 81, and the cross section area of the stop block 81 is smaller than the cross section area of the hollow segment 533 and is greater than the cross section area of the opening 532. When the second steel cable 8 passes through the slot 534 and enters the opening 532, the stop block 81 can move toward the position of the opening 532 to enter the hollow segment 533 until the stop block 81 abuts against the sleeve body 531 but cannot pass through the opening 532, and thereby the second steel cable 8 is connected to the threaded sleeve 53 through the stop block 81. In this embodiment, the second steel cable 8 passes through the opening 532 of the threaded sleeve 53 of the regulating assembly 5, the third through hole 413 of the first sleeve 41, and then goes through the second connecting end portion 32 and the sleeve joint portion 411 which are pivotally connected to each other. Then, the second steel cable 8 passes through the second rear through hole 35 of the second rod 3 and extends along the second through groove 33 to the second end 62 of the elastic element 6, so that the second steel cable 8 can be roughly accommodated in the second rod 3 and the sleeve assembly 4 to avoid the exposure affecting the overall operation.

Reference is made to FIG. 1, FIG. 2 and FIG. 10. The base 9 is pivotally connected to the sleeve assembly 4. The base 9 includes a base body 91, a bushing 92, and an auxiliary fixing element 93. The shaft rod 43 of the sleeve assembly 4 protrudes from the second sleeve 42 and pivotally connects to the base body 91 of the base 9 for the second sleeve 42 to rotate with respect to the base body 91 of the base 9, and the shaft rod 43 further passes through and protrudes out of the base body 91. The bushing 92 is disposed between the base body 91 and the second sleeve 42. The interval between the base body 91 and the second sleeve 42 is increased by the bushing 92 to prevent the friction generated when the second sleeve 42 rotates with respect to the base body 91 to affect the rotation operation. The auxiliary fixing element 93 is sleeved on the shaft rod 43 protruding from the base body 91 to provide the effect of auxiliary binding between the base body 91 and the second sleeve 42.

The fixed base A is pivotally connected to the base 9. The fixed base A includes a connection portion A1, a clamping portion A2, and an adjusting portion A3. The shaft rod 43 protrudes from the second sleeve 42 and the base body 91 of the base 9, and connects to the connection portion A1 of the fixed base A. The clamping portion A2 clamps to the working surface 2000. The adjusting portion A3 is used to adjust the tightness of the clamping portion A2 clamped on the working surface 2000.

Hereinafter, the structural operation of the supporting stand 1000 will be further described with reference to FIG. 1, FIG. 2 and FIG. 11 to FIG. 14. First, as shown in FIG. 1 and FIG. 2, The user can clamp and fix the supporting stand 1000 of the present invention on the working surface 2000 by operating the adjusting portion A3 and the clamping portion A2 of the fixed base A, and the electronic device 3000 is fixed and carried by the fixed end 12 of the bearing unit 1. According to different usage requirements, the included angle between the bearing unit 1 and the first rod 2 is adjustable on the first axis L1, the included angle between the first rod 2 and the second rod 3 is adjustable on the second axis L2, and the included angle between the second rod 3 and the sleeve assembly 4 is adjustable on the third axis L3 to change the relative position of the electronic device 3000 and the working surface 2000. Depending on the weight or position of the electronic device 3000, the supporting stand 1000 of the present invention needs to provide different supporting forces and tension for the bearing unit 1. Therefore, in addition to providing the necessary supporting force by the bearing unit 1, the first rod 2, the second rod 3, the sleeve assembly 4, the base 9 and the fixed base A as above-mentioned, it is also necessary to provide the auxiliary tension compensation through the cooperation of the regulating assembly 5 with the elastic element 6, the first steel cable 7 and the second steel cable 8.

Figure 11:
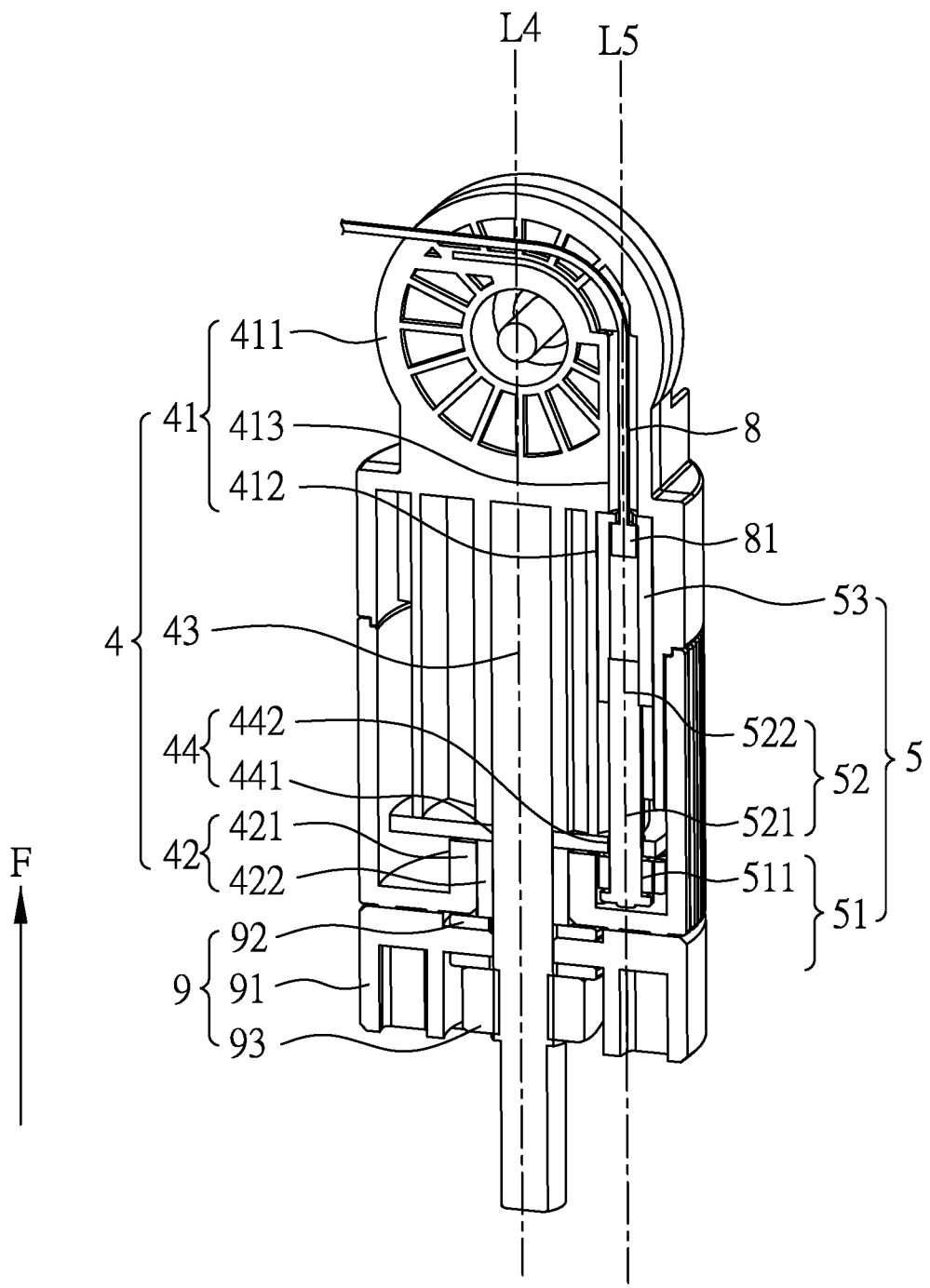
FIG. 11 is a sectional view showing the operation of the sleeve assembly and the regulating assembly of the supporting stand according to the present invention.

Referring to FIG. 2 and FIG. 11, the user can manually rotate the second sleeve 42 with respect to the first sleeve 41 and the base 9. The second sleeve 42 synchronously drives the gear structure 421 to rotate when the second sleeve 42 rotates with respect to the first sleeve 41 along a first rotating direction (for example, clockwise) on the fourth axis L4. Because the gear structure 421 and the gear 51 of the regulating assembly are engaged with each other, and the gear 51 sleeves is fixed on the smooth segment 521 of the screw 52 with a corresponding flat sided contour through the flat sided hole 511, so that the gear structure 421 synchronously drives the gear 51 and the screw 52 to rotate in reverse when the gear structure 421 rotates. Also, because the threaded segment 522 of the screw 52 engages with the threaded sleeve 53, the screw 52 drives the threaded sleeve 53 located in the containing hole 412 to move along the fifth axis L5 with respect to the first sleeve 41 during the above-mentioned rotation process and move along the normal direction F to gradually move away from the sleeve joint portion 411. Eventually, the threaded sleeve 53 will move to the position shown in FIG. 12. Furthermore, during the above-mentioned rotation, the stop block 81 of the second steel cable 8 moves along with the threaded sleeve 53 and the second steel cable 8 gradually lengthens the elastic element 6, and thereby the elastic force of the elastic element 6 is gradually increased. The first steel cable 7 provides a gradually increasing tension on the bearing unit 1 through the elongated elastic element 6, and thereby providing the increasing tension compensation for the bearing unit 1. Finally, the expected balance is maintained at the second operating position P2 shown in FIG. 14.

Figure 12:
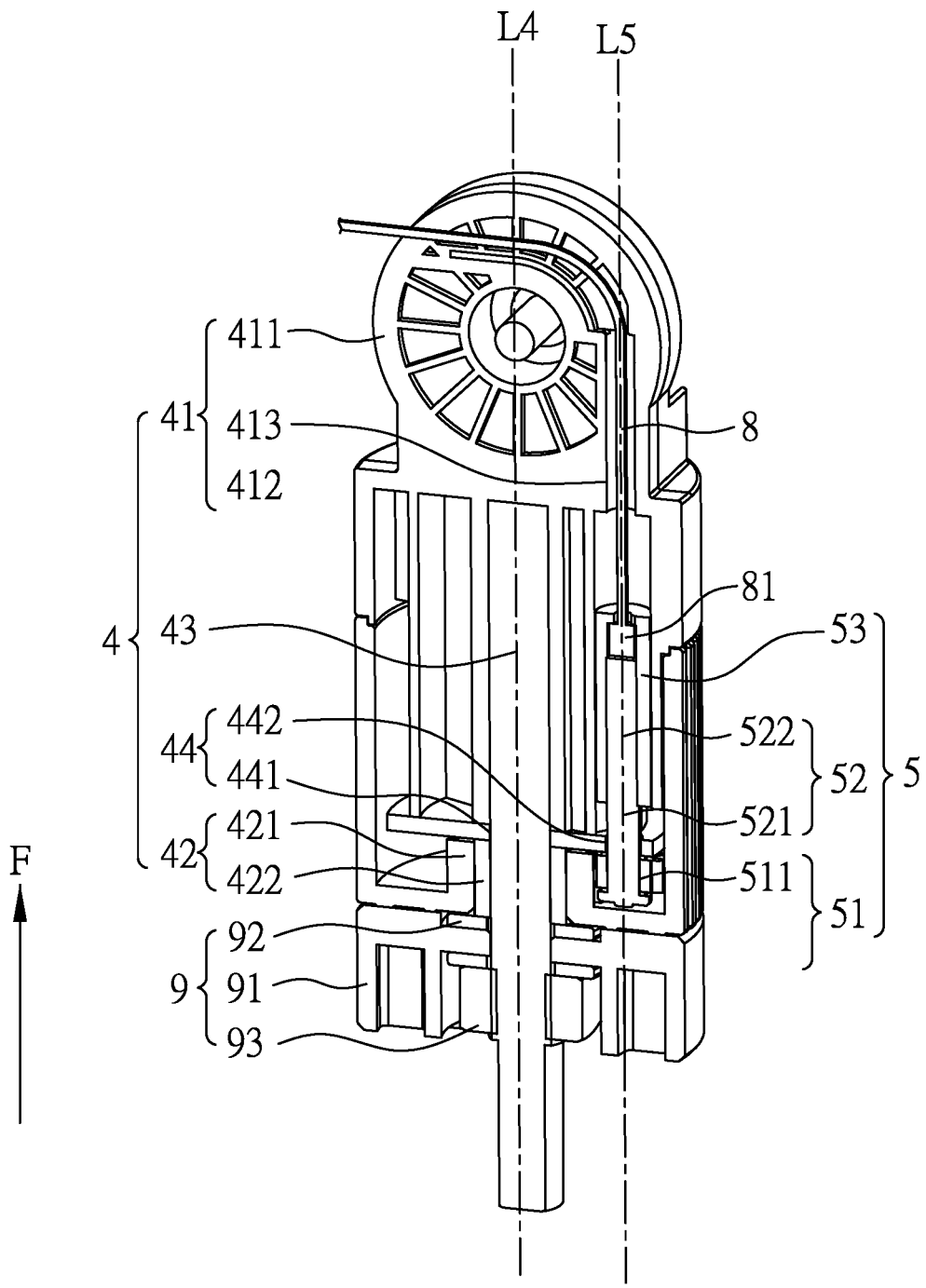
FIG. 12 is another sectional view showing the operation of the sleeve assembly and the regulating assembly of the supporting stand according to the present invention.
Figure 13:
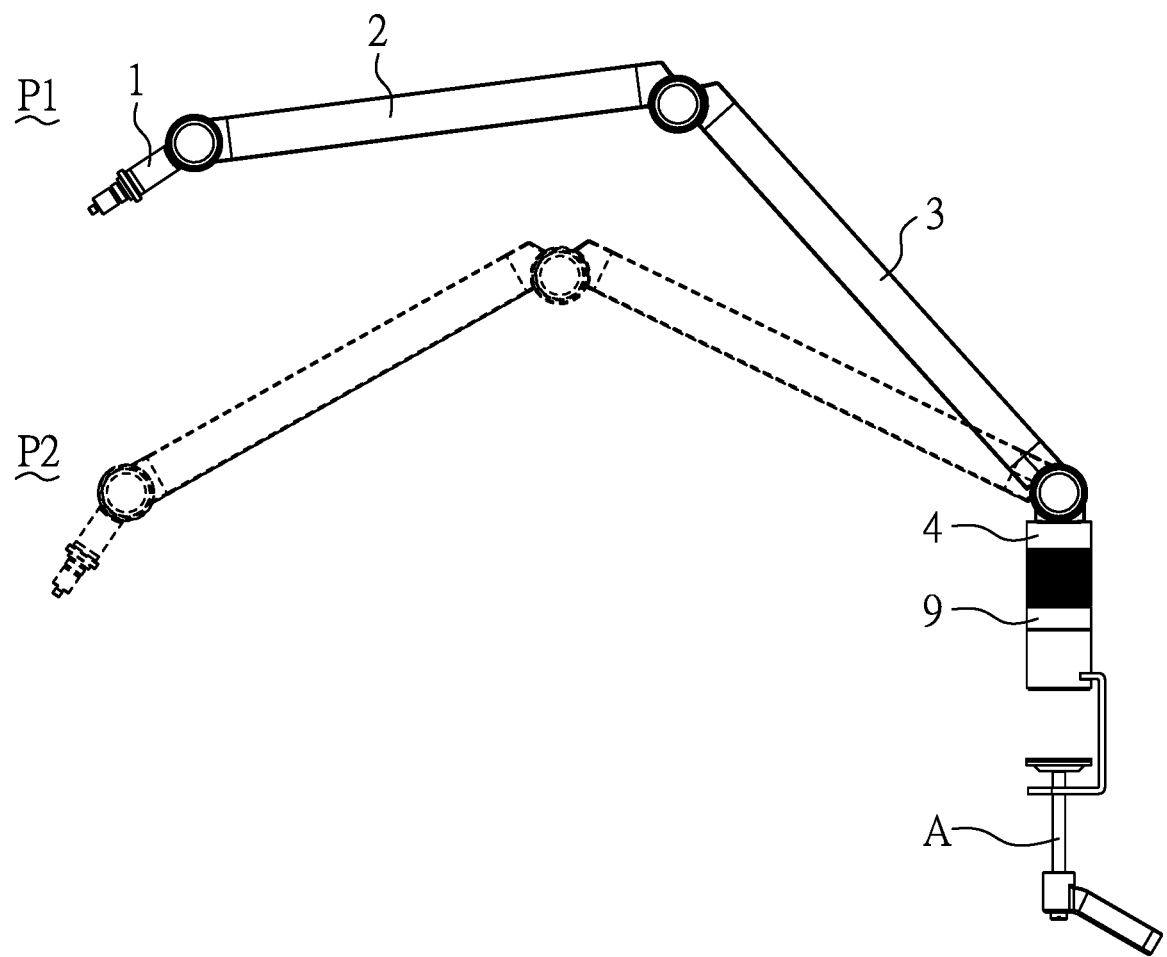
FIG. 13 is a schematic view presenting a first operating position of the supporting stand according to the present invention.
Figure 14:
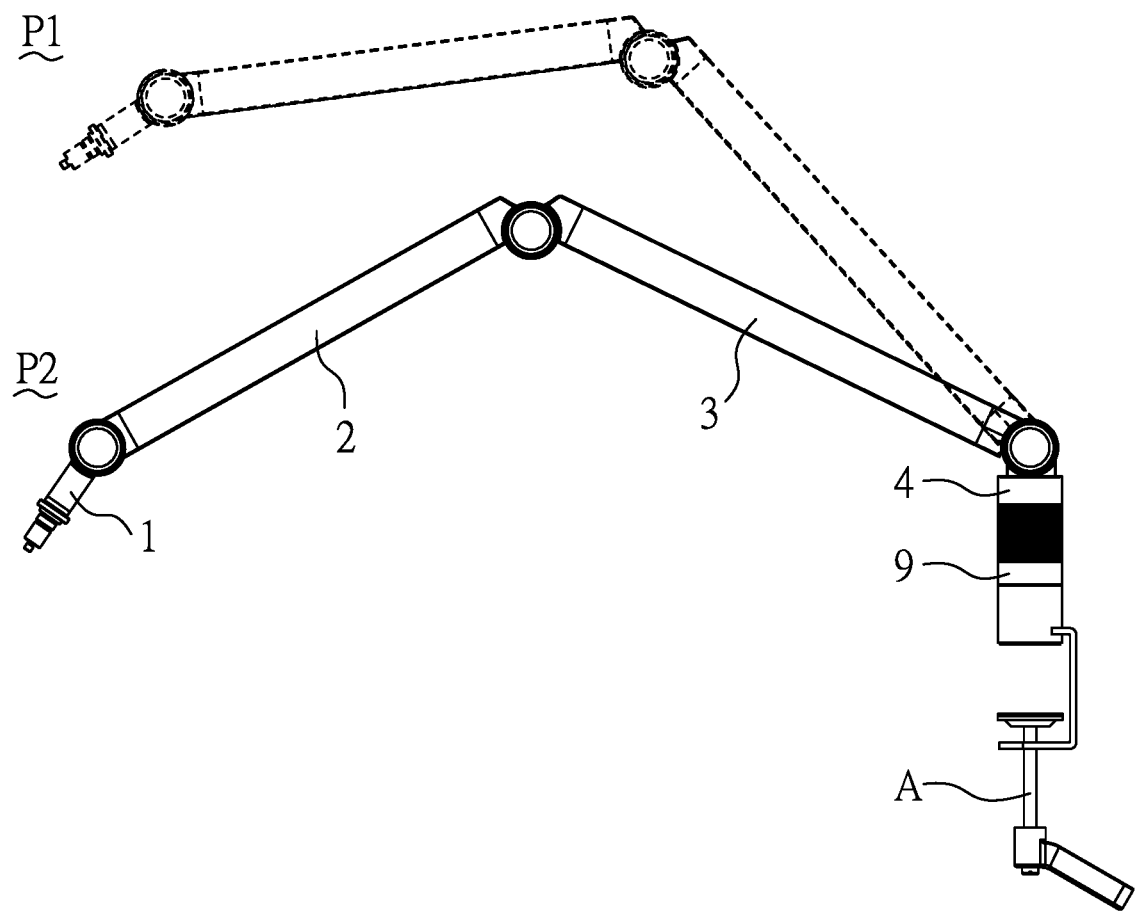
FIG. 14 is a schematic view presenting a second operating position of the supporting stand according to the present invention.

Conversely, as shown in FIG. 2 and FIG. 12, when the second sleeve 42 rotates with respect to the first sleeve 41 along a second rotating direction (for example, counterclockwise) opposite to the aforementioned first rotating direction on the fourth axis L4, the second sleeve 42 also synchronously drives the gear structure 421 to rotate, and synchronously drives the gear 51 and the screw 52 to rotate in reverse.

Because the screw 52 engages with the threaded sleeve 53, the screw 52 drives the threaded sleeve 53 located in the containing hole 412 to move along the fifth axis L5 with respect to the first sleeve 41 during the above-mentioned rotation and move toward the opposite direction of the normal direction F to gradually approach the sleeve joint portion 411. Eventually, the threaded sleeve 53 will move to the position shown in FIG. 11. Furthermore, during the above-mentioned rotation, the stop block 81 of the second steel cable 8 moves along with the threaded sleeve 53 and gradually shortens the elastic element 6, and thereby the elastic force of the elastic element 6 is gradually decreased. The first steel cable 7 provides a gradually decreasing tension on the bearing unit 1 through the shortened elastic element 6, and thereby providing the decreasing tension compensation for the bearing unit 1. Finally, the expected balance is maintained at the first operating position P1 shown in FIG. 13.

Figure 15:
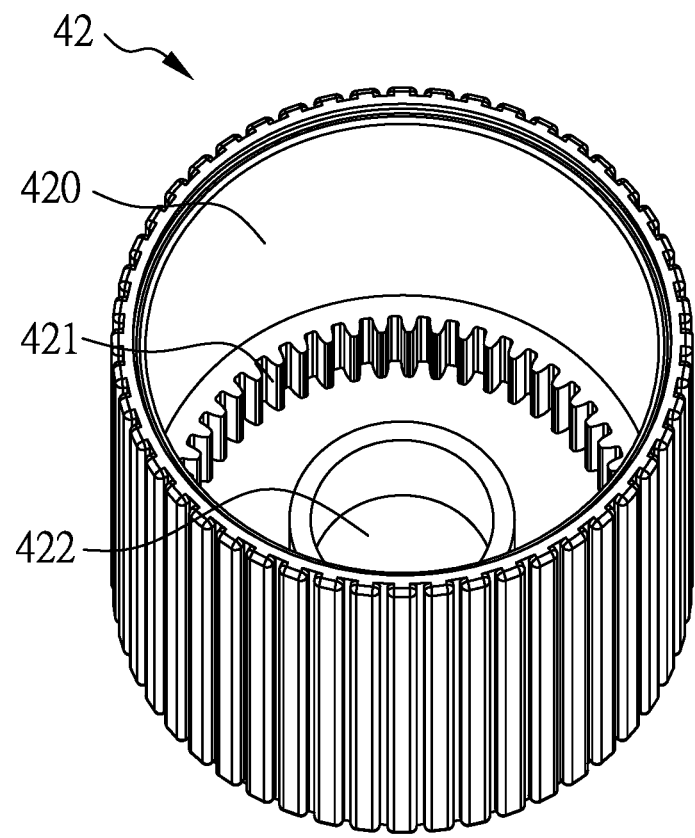
FIG. 15 is a schematic view of another embodiment of the second sleeve of the sleeve assembly of the supporting stand according to the present invention

Please refer to FIG. 2 and FIG. 15. In another embodiment of the present invention, the gear structure 421 of the second sleeve 42 of the sleeve assembly 4 is an internal gear and is disposed on the inner peripheral surface of the hollow shell 420, and the shaft hole 422 still penetrates through the center of the hollow shell 420. When the regulating assembly is disposed in the sleeve assembly 4, the gear structure 421 is configured as an internal gear engaging with the gear 51 which is configured as an external gear, so that the gear structure 421 drives the gear 51 and the screw 52 to rotate when the second sleeve 42 rotates with respect to the first sleeve 41, which can also provide the similar effect of the tension compensation.

According to the above descriptions, the supporting stand 1000 of the present invention uses the engagement design of the matched gear elements, so that the user only needs to rotate the second sleeve 42 of the sleeve assembly 4 in different rotating directions to drive the gear 51 and the screw 52 of the regulating assembly 5 to rotate, and thereby drives the threaded sleeve 53 with sufficient displacement for driving the second steel cable 8, the elastic element 6 and the first steel cable 7, so as to easily achieve the effect of adjusting the tension compensation for the bearing unit 1. According to the change of the supporting torque required due to the user adjusting the position or posture of the electronic device 3000, it can be easily and quickly adjusted to the suitable and sufficient matched bearing capacity by rotating the sleeve assembly 4.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A supporting stand, being disposed on a working surface to bear an electronic device, the supporting stand comprising:
    a bearing unit connecting with the electronic device, the bearing unit including a joint end;
    a first rod including a first connecting head portion and a first connecting end portion, wherein the first connecting head portion pivotally connects with the joint end at a first axis so that the bearing unit is able to rotate with respect to the first rod;
    a second rod including a second connecting head portion and a second connecting end portion, wherein the second connecting head portion pivotally connects with the first connecting end portion at a second axis so that the first rod is able to rotate with respect to the second rod;
    a sleeve assembly including a first sleeve, a second sleeve and a shaft rod, wherein the first sleeve has a sleeve joint portion and a containing hole, and wherein the sleeve joint portion pivotally connects with the second connecting end portion at a third axis so that the second rod is able to rotate with respect to the sleeve assembly, the first sleeve pivotally connects with the second sleeve through the shaft rod at a fourth axis so that the second sleeve is able to rotate with respect to the first sleeve, and the second sleeve has a gear structure;
    a regulating assembly being disposed in the sleeve assembly and including a gear, a screw and a threaded sleeve, wherein the gear sleeves on and is fixed with the screw to engage with the gear structure, the screw is screwed with the threaded sleeve, and the threaded sleeve is movably disposed in the containing hole along a fifth axis;
    an elastic element being disposed in the second rod and including a first end and a second end;
    a first steel cable being connected with the first end and the first connecting head portion therebetween; and
    a second steel cable being connected with the second end and the threaded sleeve therebetween;
    wherein when the second sleeve rotates with respect to the first sleeve, the gear and the screw are driven to rotate by the gear structure to drive the threaded sleeve moving so that the second steel cable, the elastic element, and the first steel cable move simultaneously.

2. The supporting stand as claimed in claim 1, wherein the screw is disposed along the fifth axis, and the fifth axis is parallel to the fourth axis.

3. The supporting stand as claimed in claim 2, wherein the screw includes a smooth segment and a threaded segment, and the gear includes a central hole and is disposed on the smooth segment of the screw through the central hole.

4. The supporting stand as claimed in claim 3, wherein the central hole is a non-circular hole, and wherein the smooth segment has an outer contour corresponding to the non-circular hole for the gear to drive the screw rotating simultaneously.

5. The supporting stand as claimed in claim 4, wherein the gear structure has a shaft hole for the shaft rod to penetrate through, and wherein the second sleeve drives the gear structure rotating simultaneously.

6. The supporting stand as claimed in claim 5, wherein the threaded sleeve includes an opening and a hollow segment extending inwardly along the fifth axis from one end of the threaded sleeve, wherein the hollow segment communicates with an opposite end of the threaded sleeve through the opening, and wherein a cross section diameter of the opening is not less than a cross section diameter of the second steel cable.

7. The supporting stand as claimed in claim 6, wherein the threaded sleeve further comprises a slot extending inwardly from a side of the threaded sleeve and communicating with the opening and the hollow segment, and wherein a width of the slot is not less than the cross section diameter of the second steel cable.

8. The supporting stand as claimed in claim 7, wherein the second steel cable includes a stop block connecting to the threaded sleeve, and wherein a cross section area of the stop block is smaller than a cross section area of the hollow segment and is greater than a cross section area of the opening.

9. The supporting stand as claimed in claim 8, wherein the threaded sleeve further has an internal thread formed on an inner surface of the hollow segment, and wherein the screw further has an external thread formed on an outer surface of the threaded segment to screw with the internal thread of the threaded sleeve.

10. The supporting stand as claimed in claim 9, further comprising a base, wherein the shaft rod protrudes from the second sleeve and pivotally connects to the base so that the second sleeve is able to rotate with respect to the base.

11. The supporting stand as claimed in claim 10, further comprising a fixed base, wherein the shaft rod protrudes from the second sleeve and connects to the fixed base, and the fixed base clamps to the working surface.

12. The supporting stand as claimed in claim 11, wherein the containing hole is a non-circular hole, and the threaded sleeve has an outer contour corresponding to the non-circular hole so that the threaded sleeve is able to rotate with respect to the first sleeve.

13. The supporting stand as claimed in claim 1, wherein when the second sleeve rotates in a first rotating direction with respect to the first sleeve, the threaded sleeve gradually moves away from the sleeve joint portion and drives the second steel cable to gradually lengthen the elastic element, and thereby an elastic force of the elastic element is gradually increased.

14. The supporting stand as claimed in claim 13, wherein when the second sleeve rotates in a second rotating direction with respect to the first sleeve, the threaded sleeve gradually approaches the sleeve joint portion and drives the second steel cable to gradually shorten the elastic element, and thereby the elastic force of the elastic element is gradually decreased.

15. The supporting stand as claimed in claim 14, wherein the first rod further includes a first through hole, and the second rod further includes a second front through hole, and wherein the first steel cable is disposed in the first rod and the second rod, and connects with the first end of the elastic element from the first rod through the first through hole, the first connecting end portion and the second connecting head portion which are pivotally connected to each other, and the second front through hole.

16. The supporting stand as claimed in claim 15, wherein the second rod further includes a second rear through hole, and the first sleeve of the sleeve assembly further includes a third through hole, and wherein the second steel cable is disposed in the second rod and the sleeve assembly, and connects with the threaded sleeve from the second end of the elastic element through the second rear through hole, the second connecting end portion and the sleeve joint portion which are pivotally connected to each other, and the third through hole.

* * * * *